US010284046B2

(12) United States Patent
Kuroda et al.

(10) Patent No.: US 10,284,046 B2
(45) Date of Patent: May 7, 2019

(54) DC BRUSH MOTOR

(71) Applicant: MINEBEA CO., LTD., Kitasaku-gun, Nagano (JP)

(72) Inventors: Minoru Kuroda, Sakaiminato (JP); Masami Ota, Tottori (JP)

(73) Assignee: Minebea Co., Ltd., Nagano (JP)

( * ) Notice: Subject to any disclaimer, the term of this patent is extended or adjusted under 35 U.S.C. 154(b) by 849 days.

(21) Appl. No.: 14/574,542

(22) Filed: Dec. 18, 2014

(65) Prior Publication Data
US 2015/0180299 A1   Jun. 25, 2015

(30) Foreign Application Priority Data

Dec. 24, 2013 (JP) ................ 2013-265096

(51) Int. Cl.
| | |
|---|---|
| *H02K 5/00* | (2006.01) |
| *H02K 5/10* | (2006.01) |
| *H02K 5/22* | (2006.01) |
| *H02K 5/12* | (2006.01) |
| *H02K 5/14* | (2006.01) |

(52) U.S. Cl.
CPC ............. *H02K 5/10* (2013.01); *H02K 5/12* (2013.01); *H02K 5/145* (2013.01); *H02K 5/225* (2013.01)

(58) Field of Classification Search
CPC ........ H02K 23/38; H02K 27/02; H02K 39/04; H02K 39/32; H02K 39/38; H02K 5/10; H02K 5/22; H02K 7/11
See application file for complete search history.

(56) References Cited

U.S. PATENT DOCUMENTS

| | | | |
|---|---|---|---|
| 4,873,464 A | 10/1989 | Wang | |
| 5,015,896 A | 5/1991 | Wong | |
| 5,270,596 A | 12/1993 | Shibuya et al. | |
| 6,224,169 B1 * | 5/2001 | Aoki | ............... B60T 8/368 303/116.4 |

(Continued)

FOREIGN PATENT DOCUMENTS

| | | |
|---|---|---|
| JP | S63-182666 U | 11/1988 |
| JP | 09-037531 A | 2/1997 |

(Continued)

OTHER PUBLICATIONS

Office Action dated Mar. 6, 2018 in the corresponding Japanese patent application 2017-021053.

*Primary Examiner* — Thomas Truong
*Assistant Examiner* — Leda Pham
(74) *Attorney, Agent, or Firm* — Carrier Blackman & Associates, P.C.; Joseph P. Carrier; Jeffrey T. Gedeon

(57) ABSTRACT

There is provided a DC brush motor that is provided with: a magnet; an armature configured to rotate relative to the magnet about a rotary axis, the armature comprising a commutator; a bracket configured to cover one end portion of the magnet and the armature at one side along the rotary axis; a female terminal that is fixed to the bracket; a brush that is electrically connected to the female terminal, and a sealing member that is fixed to the bracket. The bracket is provided with a recessed portion formed on an outer periphery thereof and configured to accommodate therein the female terminal. The sealing member is configured to seal between the recessed portion and a space where the commutator and the brush exist.

8 Claims, 12 Drawing Sheets

(56) References Cited

U.S. PATENT DOCUMENTS

| | | | | |
|---|---|---|---|---|
| 6,400,058 B1* | 6/2002 | Liau | ................... | H02K 11/026 |
| | | | | 310/239 |
| 6,417,595 B1* | 7/2002 | Wasson | ................... | H02K 5/10 |
| | | | | 310/220 |
| 7,102,266 B2* | 9/2006 | Coles | ................... | H02K 5/10 |
| | | | | 310/220 |
| 7,352,103 B2* | 4/2008 | Shawcross | ............ | H01R 39/46 |
| | | | | 310/220 |
| 8,952,593 B2* | 2/2015 | Lee | ................... | H02K 11/026 |
| | | | | 310/239 |
| 2002/0167238 A1* | 11/2002 | Kogure | ................ | H02K 5/148 |
| | | | | 310/89 |
| 2010/0270879 A1* | 10/2010 | Matsushita | ........... | H02K 5/145 |
| | | | | 310/71 |

FOREIGN PATENT DOCUMENTS

| JP | 2005-130583 A | 5/2005 |
|---|---|---|
| JP | 2009-077520 A | 4/2009 |
| JP | 2010-207025 A | 9/2010 |

* cited by examiner

DC BRUSH MOTOR

BACKGROUND OF THE INVENTION

1. Field of the Invention

The present invention relates to a DC brush motor, and more particularly, to a DC brush motor that is provided with a female terminal.

2. Description of the Related Art

In a DC brush motor, a contact part between the brush and a commutator is corroded by a toxic gas such as siloxane gas, so that a contact failure occurs. For example, a siloxane gas is generated from a silicon rubber and the like provided in an atmosphere where the DC brush motor is used, and the siloxane gas is introduced into the motor. The siloxane gas introduced into the motor is decomposed by the energy (spark) generated when the brush and the commutator slide, and is then recombined to be silicon dioxide, which is an insulator. The silicon dioxide is deposited on the contact part, thereby inhibiting an electrical contact between the brush and the commutator.

In order to suppress the contact failure due to the toxic gas, a sealing member (seal member) is adhered to a case configured to accommodate therein a magnet, an armature and the like from an outer side of the case, thereby sealing an inside of the case. Such configuration is disclosed in JP-A-2009-077520 and JP-A-9-037531, for example.

W-A-2009-077520 discloses a commutator motor having a sealing cover having an outer diameter smaller than an inner diameter of an opening end portion of a motor housing, having an outward shape corresponding to the motor housing and having a thickness defined to form therein a space. In the commutator motor, the sealing cover is disposed on an outer surface of an end bell, an outer periphery-side of the sealing cover and the end bell is sealed therebetween and the outer periphery-side of the sealing cover and the motor housing is sealed therebetween. From a side surface of the motor housing, a lead wire for electrical connection between a brush base and an outside is taken out.

JP-A-9-037531 discloses a commutator motor including a motor case configured by a combination of a stator case and a side plate, and a rotor part and a stator part embedded in the motor case. In the commutator motor, a seal member is adhered to a spring opening hole formed on the side plate, so that the spring opening hole is blocked. From the side plate, a terminal connected to the brush protrudes.

In JP-A-2009-077520 and JP-A-9-037531, the terminals (the lead wire in JP-A-2009-077520, the terminal in JP-A-9-037531) for feeding power to the motor are all male terminals and protrude outwardly beyond the case (the motor housing in JP-A-2009-077520, the side plate in JP-A-9-037531).

On the other hand, when the terminal for feeding power to the motor is a female terminal, it is difficult to seal the inside of the case because the female terminal is disposed in the case. Also, the problem that the contact failure is caused due to the toxic gas such as siloxane gas still remains.

SUMMARY OF THE INVENTION

The present invention has been made in view of the above circumstances, and one of objects of the present invention is to provide a DC brush motor capable of suppressing a contact failure between the brush and a commutator.

According to an illustrative embodiment of the present invention, there is provided a DC brush motor that is provided with: a magnet; an armature configured to rotate relative to the magnet about a rotary axis, the armature comprising a commutator; a bracket configured to cover one end portion of the magnet and the armature at one side along the rotary axis; a female terminal that is fixed to the bracket; a brush that is electrically connected to the female terminal, and a sealing member that is fixed to the bracket. The bracket is provided with a recessed portion formed on an outer periphery thereof and configured to accommodate therein the female terminal. The sealing member is configured to seal between the recessed portion and a space where the commutator and the brush exist.

DETAILED DESCRIPTION

Hereinafter, illustrative embodiments of the present invention will be described with reference to the drawings.

Figure 1:
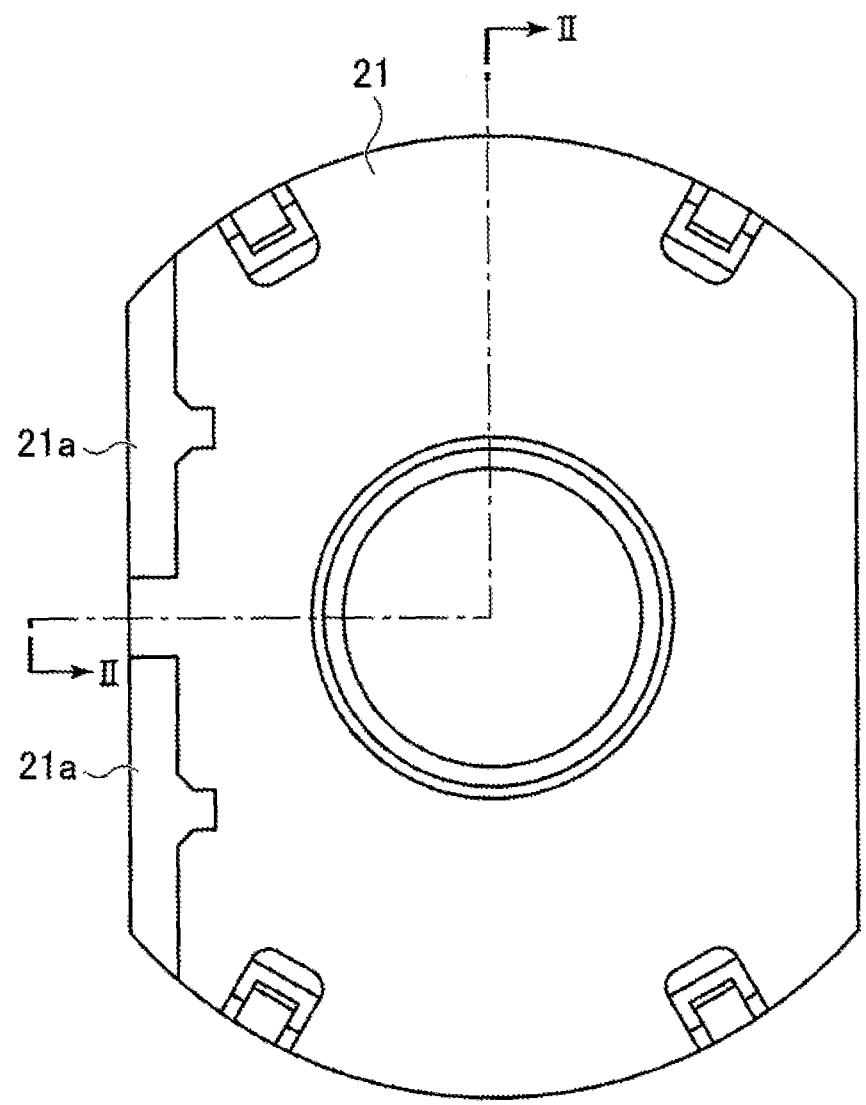
FIG. 1 is side view illustrating a configuration of a DC brush motor according to a first illustrative embodiment of the present invention.
Figure 2:
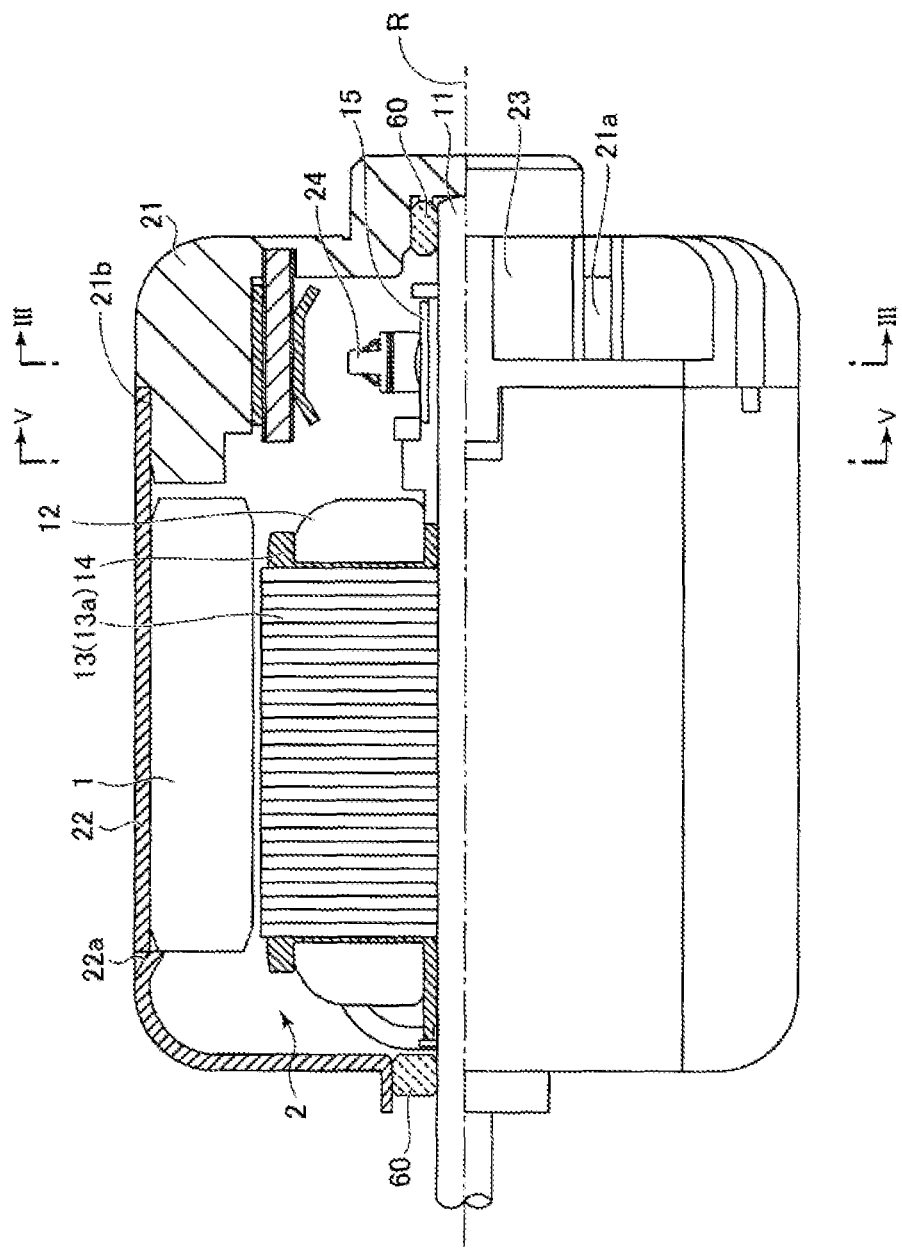
FIG. 2 is a half sectional view taken along a line II-II of FIG. 1.

FIG. 1 is side view illustrating a configuration of a DC brush motor according to a first illustrative embodiment of the present invention, which is a side view of a counter output shaft-side. FIG. 2 is a half sectional view taken along a line II-II of FIG. 1. Also, one side (the right side in FIG. 2) along a rotary axis R of a DC brush motor may be referred to as a counter output shaft-side, and the other side (the left side in FIG. 2) along the rotary axis R of the DC brush motor may be referred to as an output shaft-side.

Referring to FIGS. 1 and 2, a DC brush according to this illustrative embodiment is mainly provided with a magnet 1, an armature 2, brackets 21, 23, a case 22 and bearings 60.

The magnet 1 is fixed to an inner periphery of the case 22. The magnet 1 is configured by a pair of magnets and is arranged so that magnetization centers of each of the magnetic poles face each other.

The armature 2 is mounted at an inner periphery-side of the magnet 1. The armature 2 is configured to rotate relative to the magnet 1 about the rotary axis R. The armature 2 includes a shaft 11, a coil 12, an armature core 13, an insulator 14 and a commutator 15. The shaft 11 includes the rotary axis R. The armature core 13 is fixed to the shaft 11. The armature core 13 is configured by stacking a plurality of core pieces, which are flat plates, in a direction along the rotary axis R, for example. The armature core 13 includes a plurality of teeth parts 13a radially extending about the rotary axis R. Each of the plurality of teeth parts 13 is wound with the coil 12. The coil 12 and the armature core 13 are insulated from each other by the insulator 14. The commutator 15 is fixed to the shaft 11 at a closer position to the counter output shaft-side than the armature core 13. The commutator 15 is electrically connected to the coil 12.

The bracket 21 is attached to the case 22. The bracket 23 is attached to the bracket 21. The brackets 21, 23 are configured to cover a counter output shaft-side end portion of the armature 2. The case 22 is configured to cover an output shaft-side end portion of the armature 2 and an outer periphery-side of the magnet 1 and the armature 2. An outer periphery of an output shaft-side end portion of the bracket 21 is formed with a concave portion 21b. An inner periphery of a counter output shaft-side end portion of the case 22 and an outer periphery of the concave portion 21b are in close contact with each other.

Outer peripheries of the brackets 21, 23 are formed with two recessed portions 21a. Each of the recessed portions 21a may be provided with a cover (not shown) for partitioning an inside and an outside of the recessed portion 21a.

The case 22 includes a notch 22a. The notch 22a is bent towards the inner periphery of the case 22 in an amount enabling an inside and an outside of the case 22 not to communicate with each other. By the notch 22a, a position of the magnet 1 in the direction of the rotary axis R is determined.

The bearings 60 support the armature 2 so that it can rotate relative to the magnet 1. The bearings 60 are mounted between the case 22 and the shaft 11 and between the bracket 21 and the shaft 11, respectively.

Figure 3:
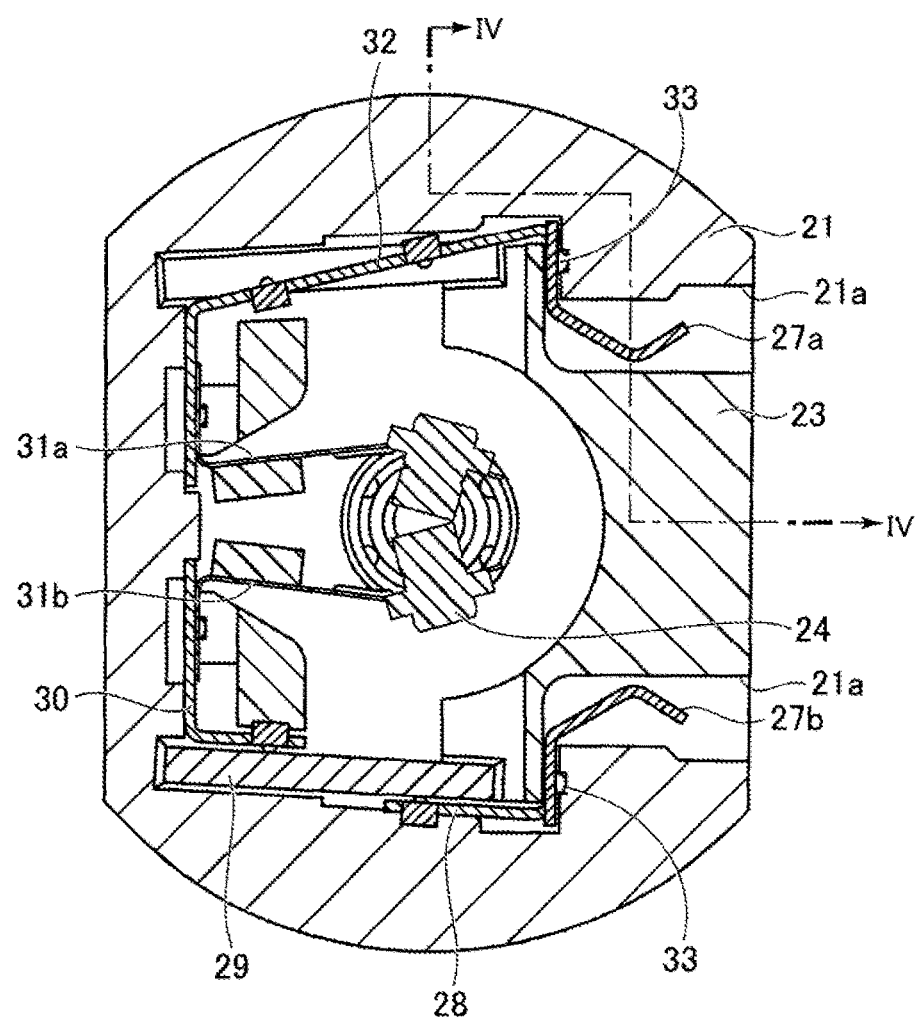
FIG. 3 is a sectional view taken along a line III-III of FIG. 2.
Figure 4:
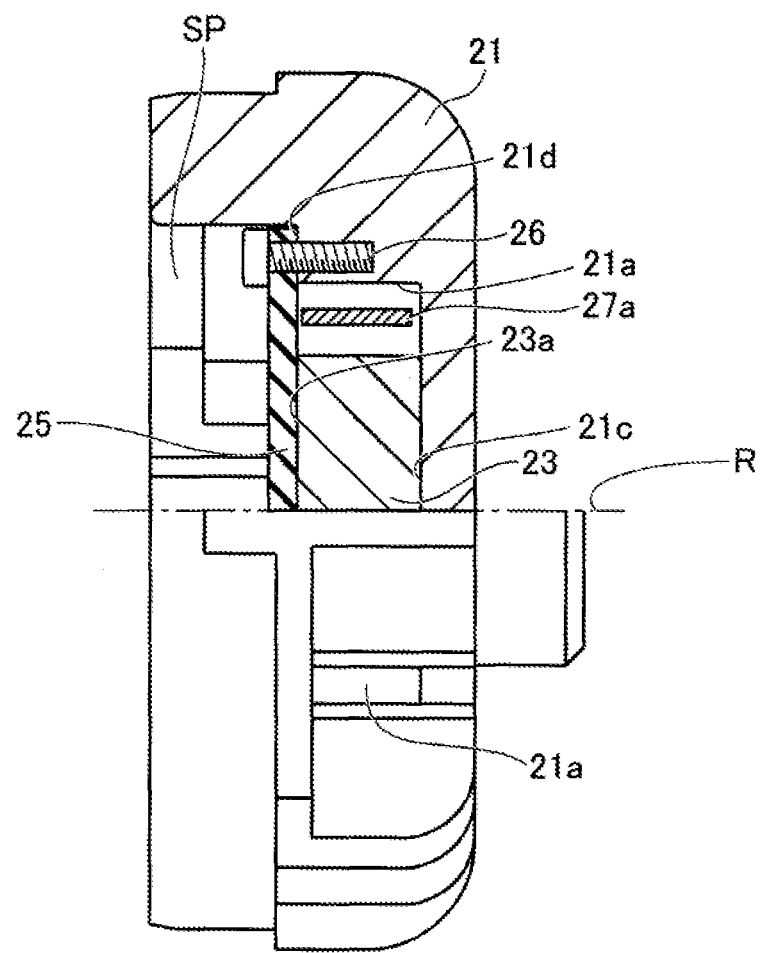
FIG. 4 is a half sectional view taken along a line IV-IV of FIG. 3.

FIG. 3 is a sectional view taken along a line III-III of FIG. 2. FIG. 4 is a half sectional view taken along a line IV-IV of FIG. 3. Also, in FIGS. 3, 6 to 8 and 11, the members of the armature 2, such as the commutator 15, are not shown, and brushes 24 are shown as if they are contacted by a spring property of conductive members 31a, 31b, which will be described later.

Referring to FIGS. 3 and 4, the DC brush motor is further provided with the brushes 24, power feeding terminals 27a, 27b having a spring property, conductive members 28, 30, 31a, 31b, 32 having a spring property and a Positive Temperature Coefficient (PTC) thermistor 29.

The bracket 23 is fixed to the inner periphery of the bracket 21 at the upper-right and lower-right sides in FIG. 3 by screws 33. The bracket 23 is contacted to an inner wall surface 21c (FIG. 4) of a counter output shaft-side end portion of the bracket 21. The recessed portions 21a are configured by the brackets 21, 23. An output shaft-side (the left side in FIG. 4) of the recessed portion 21a is not formed with the bracket and is opened.

The power feeding terminals 27a, 27b are configured as female terminals and are electrically connected to the brushes 24, respectively. The power feeding terminals 27a, 27b are accommodated in the recessed portions 21a and are exposed to the outer peripheries of the brackets 21, 23 through the recessed portions 21a, respectively. The power feeding terminals 27a, 27b are respectively interposed between the bracket 21 and the bracket 23, so that they are fixed to the brackets 21, 23.

The PTC thermistor 29 is fixed to the lower inner periphery of the bracket 21 in FIG. 3 by the conductive member 28 and the conductive member 30. The conductive members 28, 30 have a spring property and are electrically connected to the PTC thermistor 29 with being contacted thereby by the spring force thereof. The conductive member 28 is configured to electrically connect the power feeding terminal 27b and the PTC thermistor 29.

The brushes 24 are supported in the brackets 21, 23 by the two conductive members 31a, 31b and are contacted to an outer periphery of the commutator 15, as shown in FIG. 2. The conductive member 30 is configured to electrically connect the PTC thermistor 29 and the conductive member 31b. The conductive member 32 is configured to electrically connect the conductive member 31a and the power feeding terminal 27a.

Figure 5:
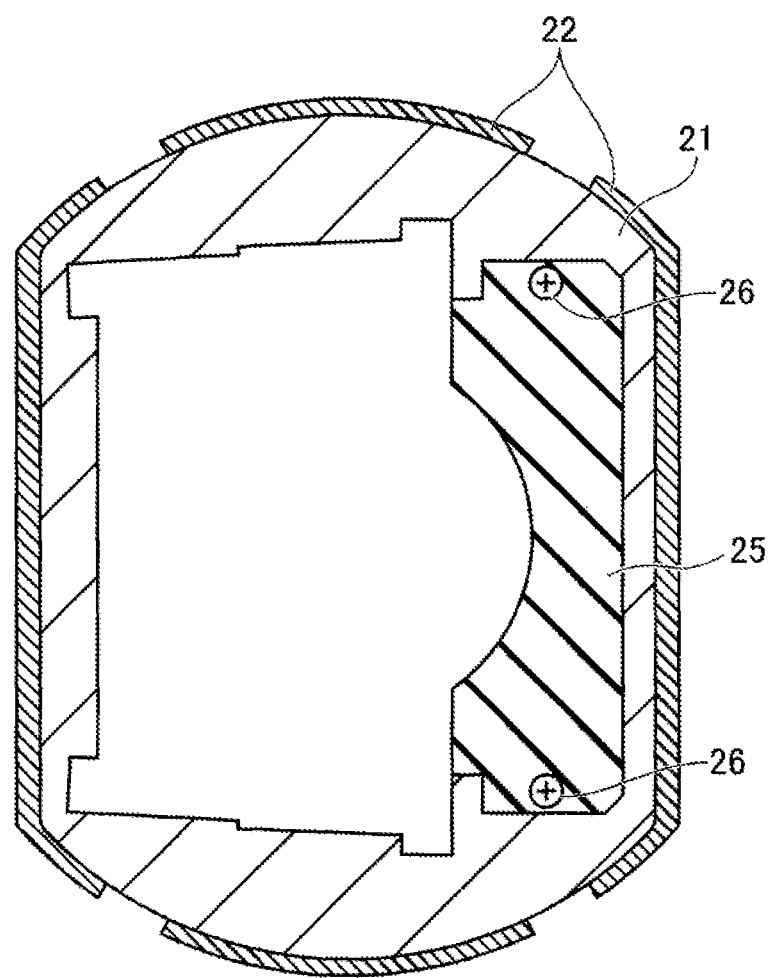
FIG. 5 is a sectional view taken along a line V-V of FIG. 2.

FIG. 5 is a sectional view taken along a line V-V of FIG. 2.

Referring to FIGS. 4 and 5, the DC brush motor is further provided with a sealing member 25. The sealing member 25 is fixed to an inner wall surface 21d of the counter output shaft-side end portion of the bracket 21 by two screws 26. The fixing method is not limited to the screw, and a welding using an ultrasonic wave, an adhesion and the like may be also used. The sealing member 25 is contacted to the inner wall surface 21d and an inner wall surface 23a of the bracket 23, as it is fixed. Thereby, an opening part of the output shaft-side (the left side in FIG. 4) of the recessed portion 21a is sealed by the sealing member 25, and the recessed portion 21a and an internal space SP (an internal space SP in which the commutator 15 and the brush 24 exist) configured by the bracket 21, the case 22 and the sealing member 25 are sealed therebetween by the sealing member 25. The internal space SP is sealed by the bracket 21, the case 22 and the sealing member 25.

Preferably, the sealing member 25 is made of the same material as the brackets 21, 23 and made of a plate-shaped resin (a resin plate). Also, the sealing member 25 may be made of a different material from the brackets 21, 23 and may be made of metal or a cured adhesive having a high viscosity. The sealing member 25 may have an arbitrary shape, rather than the plate shape. Also, the sealing member 25 has preferably the substantially same thermal coefficient of expansion as that of the bracket (for example, a thermal coefficient of expansion within ±10% of the thermal coefficient of expansion of the brackets 21, 23.

The method of fixing the power feeding terminals 27a, 27b and the sealing member 25 to the brackets is arbitrary, and an adhesion or welding may be used instead of the screw fixing method. In particular, the sealing member 25 may be configured to have a size conforming to a gap size of the brackets 21, 23, to which the sealing member 25 is fixed, and may be press-fitted in the brackets 21, 23. The brackets 21, 23 may be integrally formed. In this case, the screws 33 are not required and there is no contact part between the bracket 21 and the bracket 23, so that the air introduction therefrom is completely removed. Also, in order to improve the sealing effect of the sealing member 25, a fixing material and the like may be applied to a gap between the sealing member 25 and the bracket 21.

Subsequently, advantages of this illustrative embodiment are described with reference to FIGS. 6 to 8. Also, FIGS. 6 to 8 are sectional views taken along the same plane as FIG.

3. In FIG. 8, a region RG overlapping with the sealing member 25 is shown with the dashed-dotted line.

Figure 6:
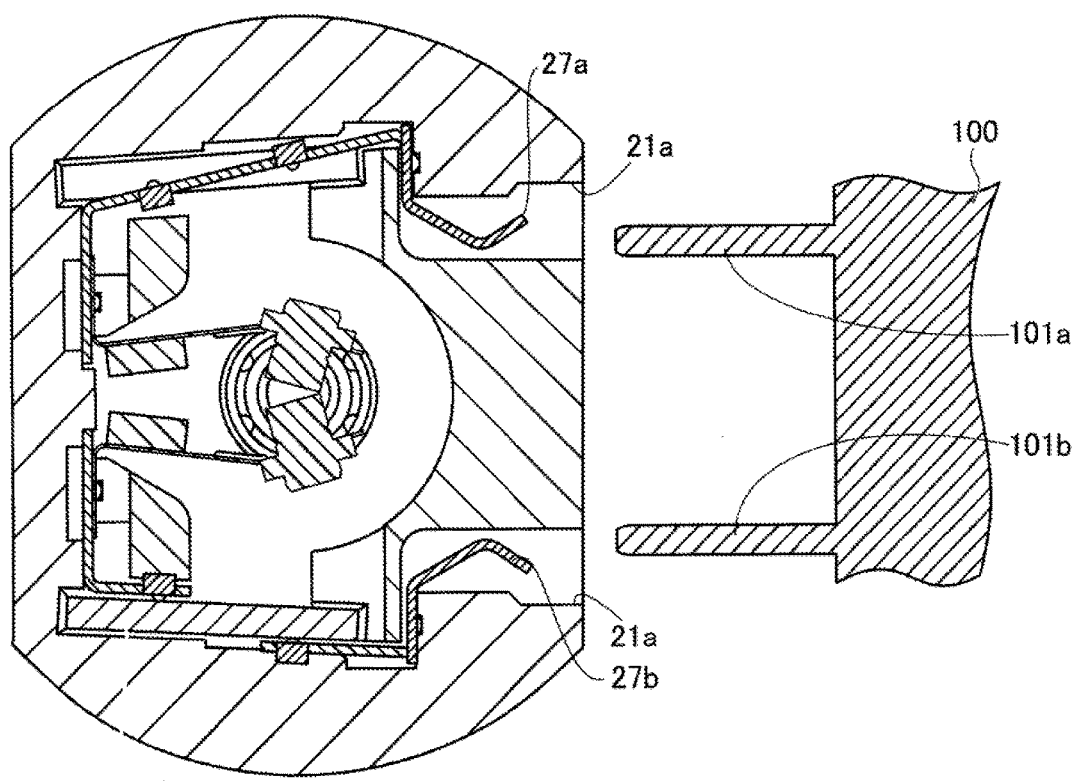
FIG. 6 is a first sectional view for illustrating an effect of the first illustrative embodiment of the present invention, which is taken along the line III-III of FIG. 2.

Referring to FIG. 6, a plug 100 is a plug of a power supply (not shown) configured to feed power to the DC brush motor. The plug 100 has two male terminals 101a, 101b.

Figure 7:
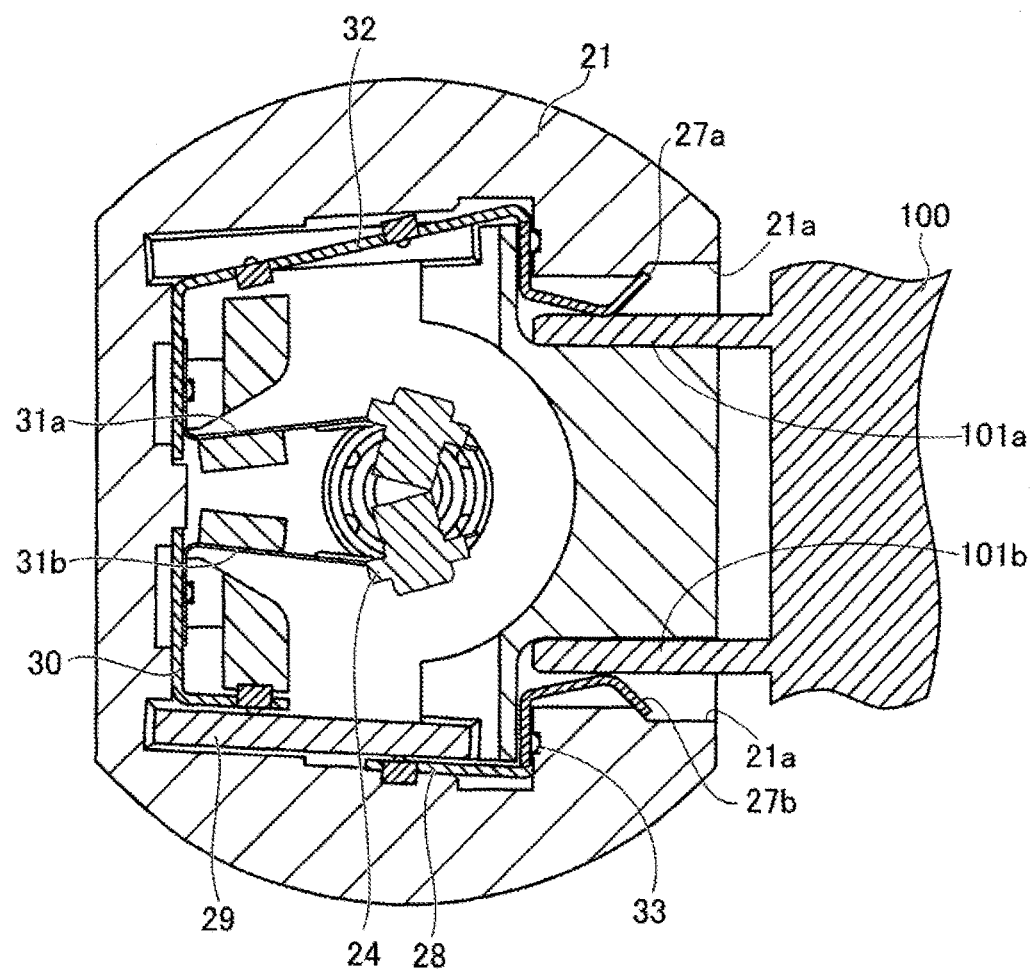
FIG. 7 is a second sectional view for illustrating the effect of the first illustrative embodiment of the present invention, which is taken along the line III-III of FIG. 2.
Figure 8:
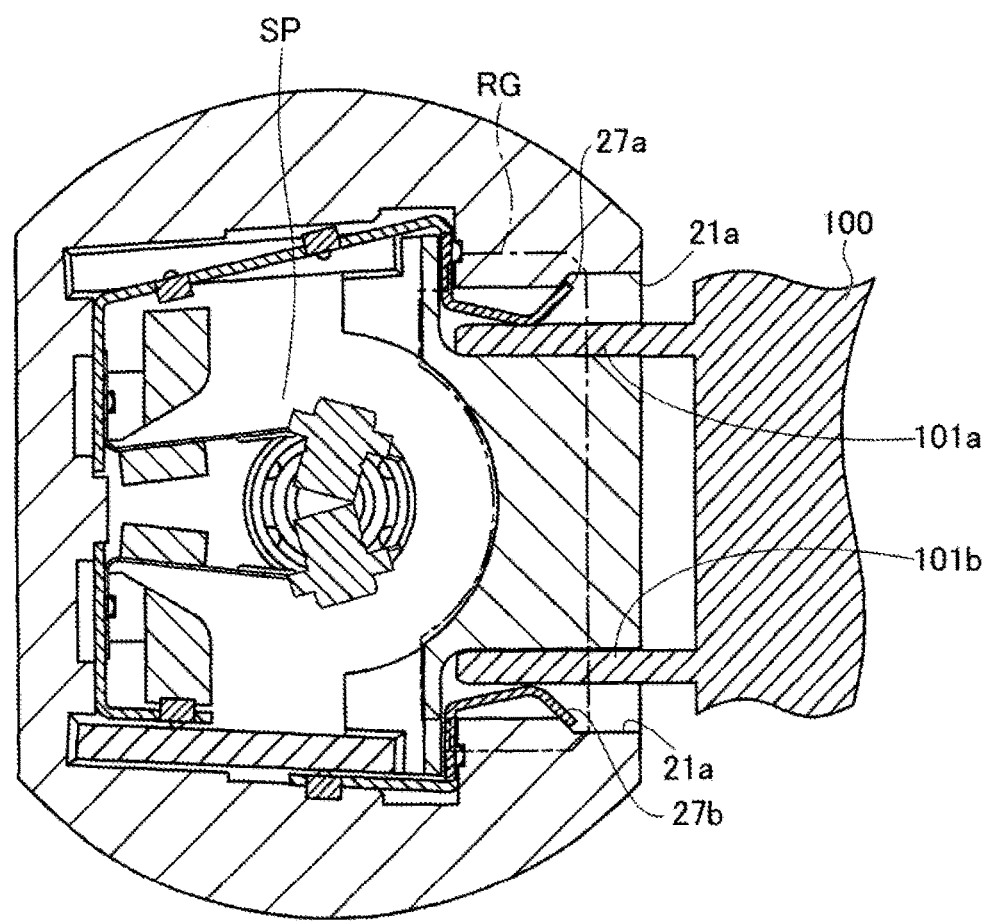
FIG. 8 is a third sectional view for illustrating the effect of the first illustrative embodiment of the present invention, which is taken along the line III-III of FIG. 2.

Referring to FIG. 7, the male terminals 101a, 101b are respectively inserted into the recessed portions 21a, so that the power feeding terminals 27a, 27b having a spring property are respectively deformed. Thereby, the male terminals 101a, 101b and the power feeding terminals 27a, 27b having a spring property are electrically connected, respectively, so that the power is fed to the DC brush motor. Specifically, when the male terminal 101b is a positive terminal and the male terminal 101a is a negative terminal, the current supplied from the power supply flows to the commutator 15 (FIG. 2) through the male terminal 101b, the power feeding terminal 27b, the conductive member 28, the PTC thermistor 29, the conductive member 30, the conductive member 31b and the brush 24. Thereafter, the current flows to the male terminal 101a through the brush 24, the conductive member 31a, the conductive member 32 and the power feeding terminal 27a.

Referring to FIG. 8, since the recessed portions 21a in which the power feeding terminals 27a, 27b are accommodated face the outside of the DC brush motor, the toxic gas such as siloxane gas contained in the outside atmosphere is introduced into the recessed portions 21a (even though the recessed portions 21a are mounted with the cover, when the male terminals 101a, 101b are inserted therein, the cover is pushed into the recessed portions 21a, so that the recessed portions 21a face the outside of the DC brush motor and the toxic gas is this introduced into the recessed portions 21a). However, since the open parts of the recessed portions 21a at the output shaft-side are sealed by the sealing member 25, the toxic gas is prevented from being introduced into the internal space SP through the recessed portions 21a. As a result, it is possible to suppress a contact failure between the brush and the commutator by the simple configuration.

Figure 9:
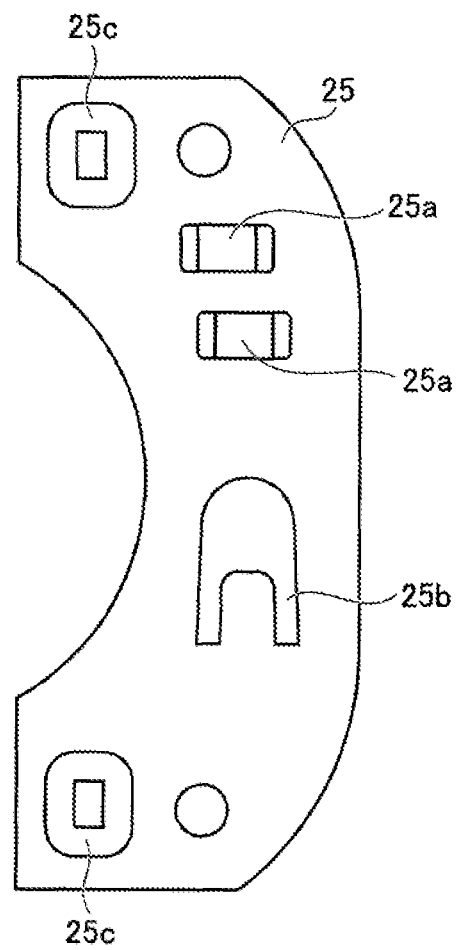
FIG. 9 is a plan view illustrating a configuration of a sealing member 25 in a second illustrative embodiment of the present invention.

FIG. 9 is a plan view illustrating a configuration of the sealing member 25 according to a second illustrative embodiment of the present invention.

Referring to FIG. 9, the sealing member 25 of this illustrative embodiment consists of a printed wiring board having a conductor (not shown) formed thereon. In other words, in this illustrative embodiment, the sealing member made of a resin plate is used as a board, a conductor is formed on the board and an electronic component is mounted thereon. For example, chip capacitors 25a, a PTC element (a recovery fuse) 25b, through-holes 25c and the like are mounted on the sealing member 25. The chip capacitors 25a, the PTC element 25b and the through-holes 25c configure an electric circuit.

Also, since the configuration of the DC brush motor except for the above-described configuration is the same in the second illustrative embodiment as the first illustrative embodiment, the overlapping descriptions are omitted.

According to this illustrative embodiment, since the sealing member 25 serves as the printed wiring board, it is possible to form the electric circuit involved in the driving of the DC brush motor on the sealing member 25, so that it is possible to reduce the number of components. In particular, when the sealing member 25 includes the chip capacitor and the like as the electronic component, it is possible to secure an Electromagnetic Compatibility (EMC) of the DC brush motor. Also, when the sealing member 25 includes the PTC element and the like as the electronic component, it is possible to protect the DC brush motor from the overcurrent.

Figure 10:
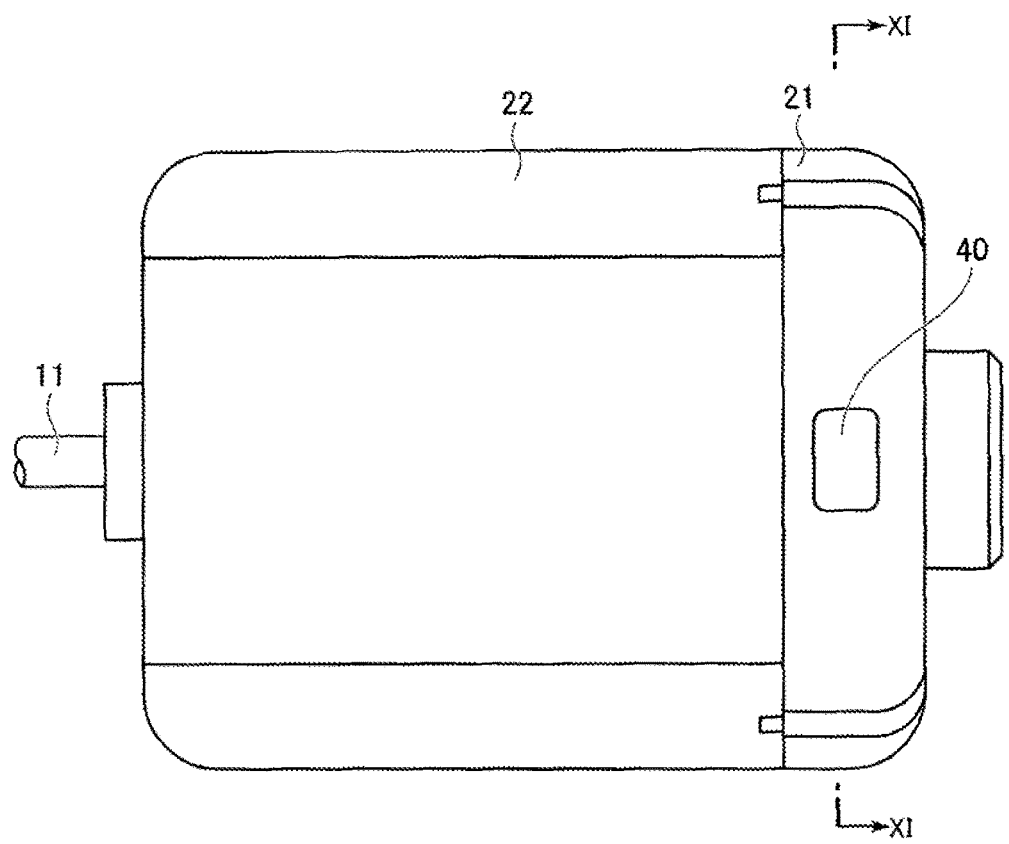
FIG. 10 is a front view illustrating a configuration of a DC brush motor according to a third illustrative embodiment of the present invention.
Figure 11:
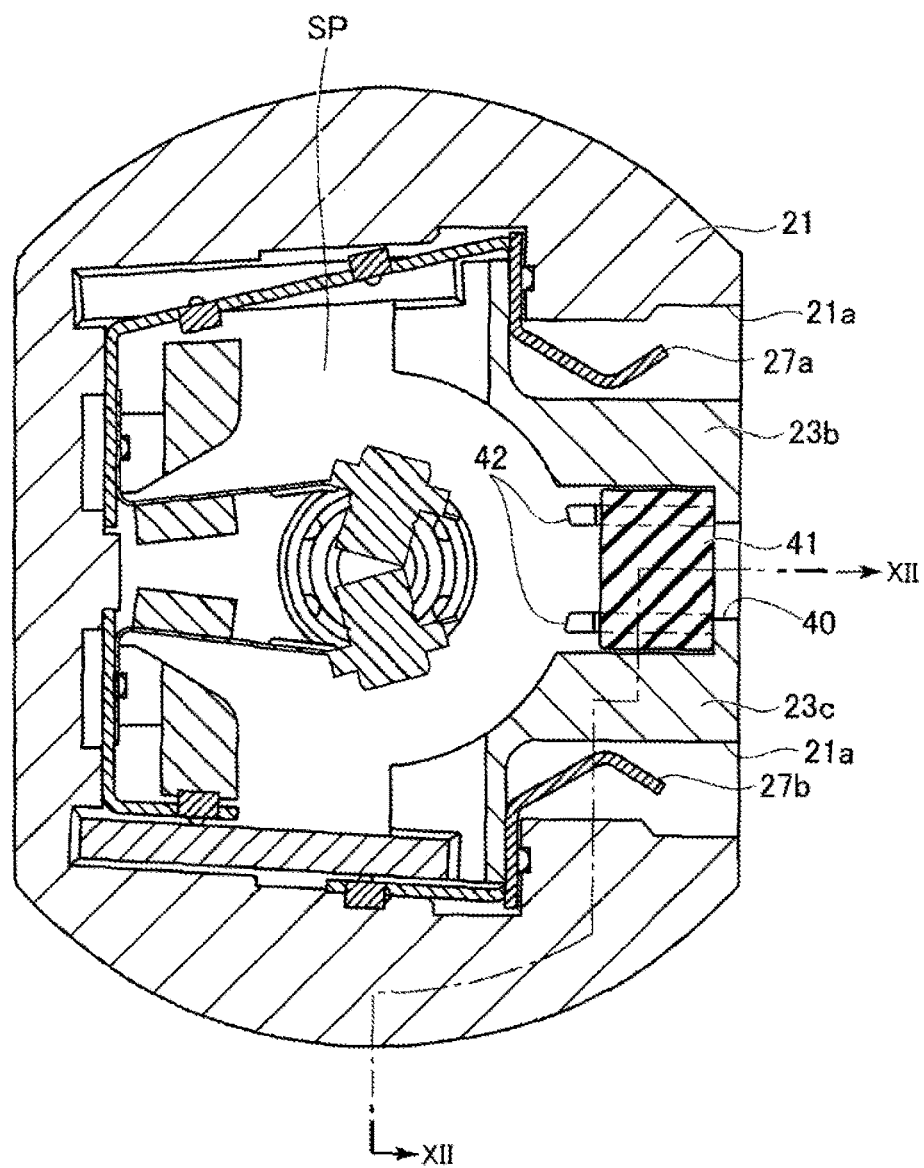
FIG. 11 is a sectional view taken along a line XI-XI of FIG. 10.
Figure 12:
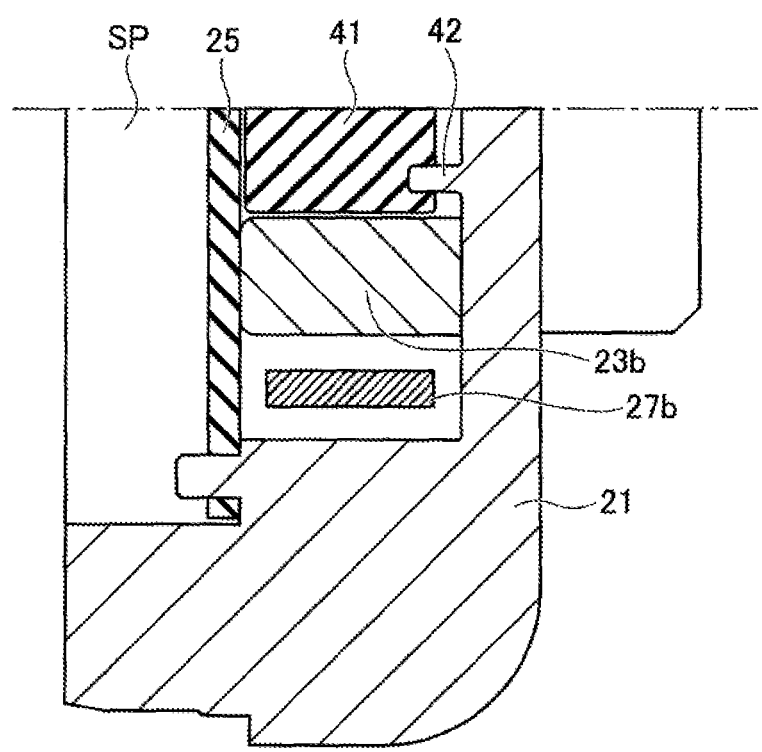
FIG. 12 is a sectional view taken along a line XII-XII of FIG. 11.

FIG. 10 illustrates a configuration of a DC brush motor according to a third illustrative embodiment of the present invention. FIG. 11 is a sectional view taken along a line XI-XI of FIG. 10. FIG. 12 is a sectional view taken along a line XII-XII of FIG. 11.

Referring to FIGS. 10 to 12, a DC brush motor of this illustrative embodiment is further provided with a gas absorbent agent 41 disposed in the brackets 21, 23. The bracket 23 includes a bracket 23b configuring the recessed portion 21a configured to accommodate therein the power feeding terminal 27a and a bracket 23c configuring the recessed portion 21a configured to accommodate therein the power feeding terminal 27b. The gas absorbent agent 41 is fixed to the brackets 23b, 23c by protrusions 42 formed at the brackets 21, 23b, 23c.

The gas absorbent agent 41 is preferably made of a material having a siloxane gas absorbing property, and is made of a resin having a sulfonic acid group, activated charcoal, silica gel, zeolite and the like, for example.

A through-hole 40 is formed between the bracket 23b and the bracket 23c. The gas absorbent agent 41 blocks the through-hole 40. When the through-hole 40 is formed, the internal space SP is not sealed because the internal space SP the inside of the brackets 21, 23) and the outside communicate with each other through the through-hole 40.

The gas absorbent agent 41 may be fixed to the sealing member 25 by an adhesion and the like. The through-hole 40 may not be formed, and the gas absorbent agent 41 may be disposed at any position in the brackets 21, 23. The brackets 21, 23 may be integrally formed.

Also, since the configuration of the DC brush motor except for the above-described configuration is the same in the third embodiment as the first illustrative embodiment, the overlapping descriptions are omitted.

According to this illustrative embodiment, the toxic gas is removed by the gas absorbent agent 41, so that it is possible to reduce a concentration of the toxic gas in the internal space SP. In particular, when the gas absorbent agent 41 is arranged to block the through-hole 40, the gas absorbent agent 41 functions as a filter of the toxic gas, so that only a harmless gas of the external gases of the DC brush motor, which are sucked from the through-hole 40, can be introduced into the internal space SP.

In the above illustrative embodiments, the inner rotor-type DC brush motor where the armature is mounted at the inner periphery-side of the magnet has been described. However, the DC brush motor may be an outer rotor-type DC brush motor where the armature is mounted at the outer periphery-side of the magnet.

The above illustrative embodiments can be appropriately combined. For example, the configuration of the third illustrative embodiment where the gas absorbent agent 41 is provided may be applied to the configuration of the second illustrative embodiment where the sealing member 25 consists of the printed wiring board.

The present invention is not limited to the illustrative embodiment described above but can be embodied by modifying the components without departing from the gist of the invention. Further, various inventions can be made by appropriately combining a plurality of components described in the above illustrative embodiment. For example, some of all components described in the above illustrative embodiment may be removed. Furthermore, the components according to another illustrative embodiment may be appropriately combined.

What is claimed is:

1. A DC brush motor comprising:

a magnet;

an armature configured to rotate relative to the magnet about a rotary axis, the armature comprising a commutator;

a bracket configured to cover one end portion of the magnet and the armature at one side along the rotary axis;

a female terminal that is fixed to the bracket;

a brush that is electrically connected to the female terminal, and a sealing member that is fixed to the bracket, wherein the bracket comprises a recessed portion formed on an outer periphery thereof, wherein the recessed portion extends through the outer periphery to communicate with an exterior of the bracket, wherein the recessed portion is configured to accommodate therein the female terminal, wherein the sealing member seals off an internal space of the bracket from communication with the exterior of the bracket via the recessed portion, and wherein the commutator and the brush are located in the internal space.

2. The DC brush motor according to claim 1, wherein the recessed portion is opened at the other side along the rotary axis, and wherein the sealing member is configured to seal the other side of the recessed portion.

3. The DC brush motor according to claim 1, wherein the sealing member is made of a plate-shaped resin.

4. The DC brush motor according to claim 1, wherein the sealing member is configured to have substantially the same thermal coefficient of expansion as that of the bracket.

5. The DC brush motor according to claim 1, wherein the sealing member is configured by a printed wiring board.

6. The DC brush motor according to claim 1 further comprising:

a gas absorbent agent that is arranged inside the bracket.

7. The DC brush motor according to claim 6, wherein the bracket further comprises a communication hole configured to connect an inside and an outside of the bracket, and wherein the gas absorbent agent is arranged at a position to block the communication hole.

8. The DC brush motor according to claim 1 further comprising a case configured to cover the one end portion of the magnet and the armature at the one side and an outer periphery-side of the magnet and the armature, wherein an internal space configured by the bracket, the case and the sealing member is sealed.

* * * * *